June 13, 1972   M. GUETTIER   3,669,510

BRAKING PRESSURE DISTRIBUTING DEVICES

Filed Dec. 17, 1969

3,669,510
BRAKING PRESSURE DISTRIBUTING DEVICES
Michel Guettier, Billancourt, France, assignor to Regie Nationale des Usines Renault, Billancourt, and Automobiles Peugeot, Paris, France
Filed Dec. 17, 1969, Ser. No. 885,690
Claims priority, application France, Dec. 23, 1968, 180,046
Int. Cl. B60t 8/18
U.S. Cl. 303—22 R                                    1 Claim

ABSTRACT OF THE DISCLOSURE

This distributor comprising a body provided with means for regulating the braking fluid pressure and disposed between the master-cylinder and the rear brakes of the vehicle, has a pivot pin carried on said body and rotatably rigid with a pair of arms of which one is in temporary contact with the front face of the control piston of the device, the other arm carrying an inertia weight.

---

The present invention relates in general to braking systems and has particular reference to a device for controlling the distribution of braking fluid pressure in the case of rear-wheel braking circuits designed for use as emergency braking means, and still more particularly to a device of the type referred to which is based on inertia for distributing the braking fluid pressure.

Certain vehicles are characterized by considerable discrepancies in the load distribution, notably passenger vehicles and certain delivery vans or like commercial vehicles driven alternately in a no-load condition and under load, the latter being applied as a rule mainly to the rear axle. In these vehicles the distribution of the braking fluid pressure to the rear brakes depends generally on the rear axle load so as to preserve the maximum efficiency of these rear brakes while preventing the rear wheels from becoming locked before the front wheels. When a calibrated distributor of braking fluid pressure controls the rear circuit of a vehicle equipped with separate rear and front braking circuits, it is not possible to produce strong decelerations of this vehicle in case of failure of the front circuit, since the distributor will either cut off or reduce considerably the fluid pressure applied to the rear brakes beyond a certain deceleration value.

Inertia braking pressure limiters are already known which comprise a movable ball valve operable in an inclined cylinder interposed between the master-cylinder and the circuit delivering braking fluid to the rear brakes. These limiters are adapted to cut off the delivery of pressure fluid controlling the rear brakes when the control deceleration value is attained. Thus, brake control fluid is still allowed to flow to the rear brakes until the vehicle speed has dropped to the so-called "control deceleration" value whatever the nature of the failure having occurred in the front-wheel braking circuits may be.

However, these braking pressure limiters are also objectionable in that they cannot warrant a satisfactory braking pressure distribution under all circumstances for the braking circiut is cut off independently of the vehicle load. A known inconvenience of these limiters lies in the fact that they actuate the circuit cut off member at a pressure value too low to permit a safe bringing of the vehicle to a standstill.

It is the essential object of this invention to provide a device adapted to avoid the inconveniences set forth hereinabove and to prevent the fluid pressure from being cut off in the rear-wheel braking circuit under predetermined conditions.

The braking fluid pressure distributor according to this invention is characterized essentially by the provision of a pivot pin mounted to the distributor body and rotatably rigid with a pair of arms, one arm being in temporary contact with the front face of the control piston of the device, and the other arm carrying an inertia weight.

The distributor can be of the type described in U.S. Pat. No. 3,153,560 to E. Henry-Biabaud, which shows a pressure regulator mounted on the frame of the vehicle and supplying the brakes of the rear wheels with brake fluid. This regulator is controlled in dependence upon the deflection of the rear axle of the vehicle. This regulator is connected at one side to the master cylinder of the braking control system and on the other side to the brakes of the vehicle rear wheels and contains a valve, opening or closing the admission of brake fluid to the brakes, the valve position being controlled through an interposed spring associated to a push member.

In the distributor according to the present invention, the piston is prevented by said one arm from moving to an operative position before the vis inertiae developed by the deceleration of the inertia weight carried by the other arm causes the first arm to move away from said piston.

Other features and advantages of this invention will appear as the following detailed description of a typical and exemplary form of embodiment thereof, given by way of example, proceeds with reference to the accompanying diagrammatic drawing, in which.

Figure 1:
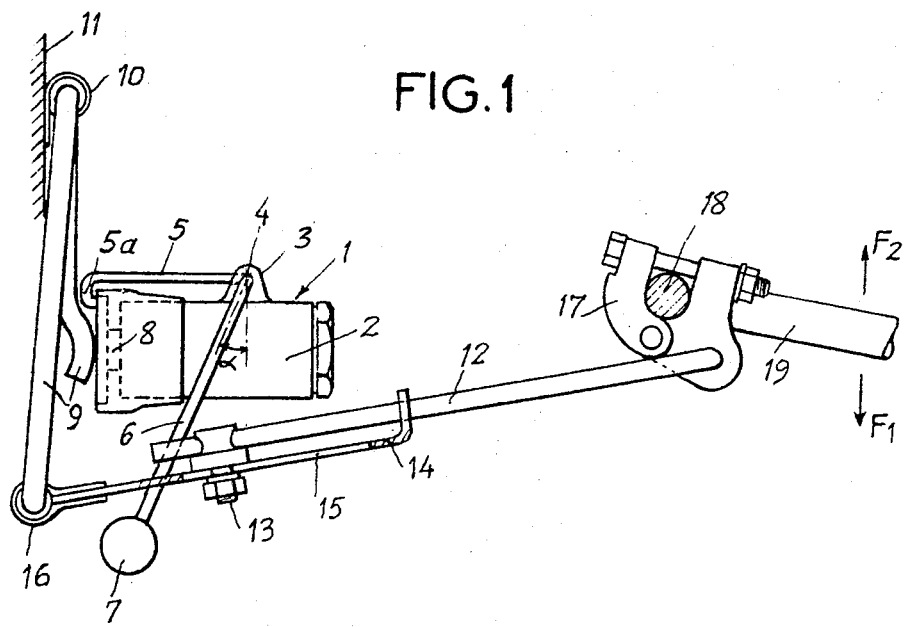
FIG. 1 is a side elevational view showing the essential component elements of the distributor control system.

Referring first to FIG. 1 the body 2 of distributor cylinder 1 carries a strap 3 having pivotally mounted therein a pivot pin 4 rotatably rigid with a pair of arms 5 and 6. The arm 6 is so positioned that it is inclined by an angle $\alpha$ to the vertical in the forward direction of the vehicle. This arm 6 carries at its lower or outer end an inertia weight 7 and the other arm 5 carries an element 5a adapted normally to lock in position the push member 8 of the distributor piston (not shown) so as to prevent this piston moving forwards to a position where the valve (not shown) of the distributor is closed and the rear brake is cut off.

A spring 9 also exerts an inward pressure against said push member 8. This spring 9 is pivoted to a bearing 10 rigid with the body or frame of the vehicle, and is adapted to be actuated by means of a control rod 12. To this end, the control rod 12 is tightened in a screw clamp 13 secured to a flat section member 14 formed with a row of holes or a slot 15 permitting the adjustment of the position of said rod 12. The flat section member 14 is rigid with an eyelet or like bearing element engaged by one end of said spring 9. Furthermore, the rod 12 is attached to a yoke 17 clamped to a torsion bar 18 of an anti-roll device equipping the vehicle, this bar 18 having lever-forming bent end portions 19 operatively connected via links 20 to the suspension arms 21 of the rear wheels 22 of the vehicle.

The torsion bar 18 performs an angular excursion according to the momentary load applied to the suspension system, and its side arms 19 are movable in the direction of the arrows $F_1$ or $F_2$; during these movements the yoke 17 actuates via the rod 12 the spring 9 of which the pressure exerted against the push member 8 of distributor 1 varies in one or the other direction.

Figure 2:
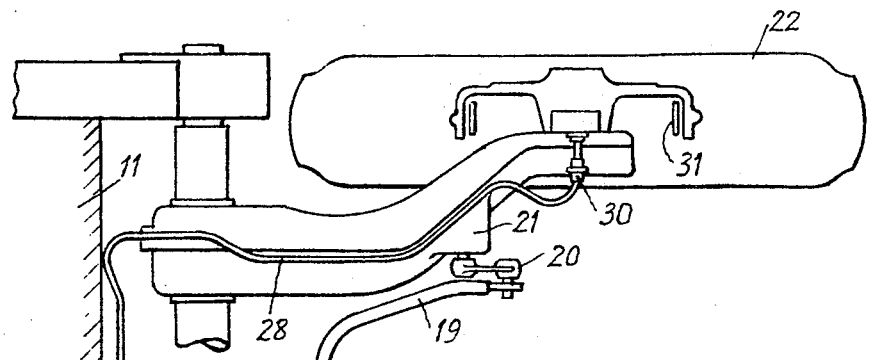
FIG. 2 is a plane view showing a practical embodiment of the distributor device and its operative connections with the rear wheels.
Figure 3:
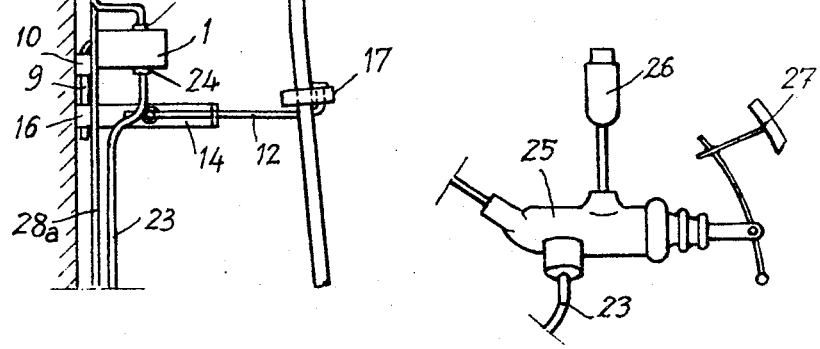
FIG. 3 shows the fluid connection between the distributor and the master-cylinder of the braking system.

As shown in FIGS. 2 and 3, a pipeline 23 connects the inlet port 24 of distributor 1 to the master-cylinder 25 of the braking system of the vehicle, which is connected to the braking fluid reservoir 26 and is adapted in the conventional fashion to deliver braking fluid under pressure to the distributor 1 when the brake pedal 27 is depressed. Another pipeline 28 connects the outlet port 29 of distributor 1 to the rear-axle brake cylinders, FIG. 2 showing diagrammatically one of the rear wheels 22 with the union 30 for delivering pressure fluid to the brake cylinder controlling the braking members 31. A branch line 28a is connected in a similar fashion to the opposite rear wheel (not shown).

The above-described device operates as follows:

During a deceleration $\gamma$ of the vehicle, the mass $m$ of the inertia weight 7 is subjected to a gravity force $mg$ and to a force of inertia $m\gamma$. As the lever arm of this weight 7 is inclined by an angle $\alpha$ to the vertical in a state of unstable equilibrium, the following equality is obtained: $m\gamma \cos \alpha = mg \sin \alpha$. If the deceleration rises to a value $\gamma'$ higher than $\gamma$, the arm 6 supporting the inertia weight 7 will move forwards and raise the lock member 5a, thus releasing the push member 8 of distributor 1 so that this push member can move freely.

In a distributor set for a minimum cut-off pressure corresponding to a deceleration $\gamma_1$, if the angle $\alpha$ is calculated to cause said lock member 5a to release the push member 8 at a value $\gamma_2 = g$ tg $\alpha$, and if it is desired to obtain a deceleration $\gamma_3$ when a failure occurs in the front-wheel braking circuit, $\alpha$ will be so calculated that $\gamma_3 < g$ tg $\alpha < \gamma_1$. Thus, decelerations $\gamma_3$ may be obtained without releasing the push-member of the distributor i.e., without closing the distributor valve. The closure of this valve can be obtained for a deceleration $\gamma_1$ greater than $\gamma_3$ when there is a failure in one of the parts of the braking circuit. In other words, the present device delays, when the vehicle decelerates, the closure of the distributor valve subject to the pressure of a spring 9 the force of which depends on the vehicle charge. The delay is as long as the deceleration of the vehicle ($\gamma_1$) does not rise over the maximum possible deceleration threshold ($\gamma_3$) in case of a failure in the braking circuit. It will be noted that the deceleration value whereat the lock member 5a releases the push-member 8 can be modified by simply adjusting the angle $\alpha$ accordingly.

Of course, various modifications and variations may be brought to the specific form of embodiment of the present invention which is shown and described herein, without departing from the scope of the invention as set forth in the appended claim.

I claim:

1. A braking pressure distributor for automobiles, comprising: a braking system having a master cylinder; a body; a piston movable in said body, said piston being movable in response to fluid pressure produced by said master cylinder, said fluid pressure acting on one face of said piston; said piston having an opposite face forming a push member; a conduit connecting said distributor to said master cylinder; a second conduit connecting said distributor to said rear wheel brakes; an inertia weight rigidly connected to a first lever; a pivot pin connected to said distributor body, said first lever pivoting on said pin; and a second lever operatively connected to said piston push member, said pivot pin being rotatably rigid with said first and second levers, said second lever forming a temporary latch of said distributor piston push member; said first lever and said pivot pin forming an angle defined by a straight line coinciding with the longitudinal axis of said first lever and a vertical line passing through the axis of said pivot pin, said angle having an increment in the normal direction of movement of the vehicle, wherein movement of said first lever through said increment causes movement of said second lever to unlatch said distributor piston push member.

References Cited

UNITED STATES PATENTS

| | | | |
|---|---|---|---|
| 3,297,368 | 1/1967 | Cumming | 303—24 A |
| 3,527,504 | 9/1970 | Chovings et al. | 303—21 A |
| 3,531,164 | 9/1970 | Francois | 303—21 A X |

MILTON BUCHLER, Primary Examiner

J. J. McLAUGHLIN, Assistant Examiner

U.S. Cl. X.R.

303—6 C, 21 A, 24 A